US009795977B2

(12) United States Patent
Grimm et al.

(10) Patent No.: US 9,795,977 B2
(45) Date of Patent: Oct. 24, 2017

(54) ELECTRICALLY ACTUATED VARIABLE PRESSURE CONTROL SYSTEM

(71) Applicants: Jeffrey John Grimm, Holton, KS (US); Graeme W. Henderson, Jacksonville, FL (US)

(72) Inventors: Jeffrey John Grimm, Holton, KS (US); Graeme W. Henderson, Jacksonville, FL (US)

(73) Assignee: Capstan Ag Systems, Inc., Topeka, KS (US)

( * ) Notice: Subject to any disclaimer, the term of this patent is extended or adjusted under 35 U.S.C. 154(b) by 8 days.

(21) Appl. No.: 14/308,774

(22) Filed: Jun. 19, 2014

(65) Prior Publication Data

US 2014/0299673 A1 Oct. 9, 2014

Related U.S. Application Data

(62) Division of application No. 11/438,183, filed on May 22, 2006, now abandoned.

(60) Provisional application No. 60/688,259, filed on Jun. 7, 2005.

(51) Int. Cl.

| | |
|---|---|
| *B05B 12/08* | (2006.01) |
| *B05B 9/04* | (2006.01) |
| *F16K 31/06* | (2006.01) |
| *A01G 25/16* | (2006.01) |

(Continued)

(52) U.S. Cl.
CPC ............ *B05B 12/085* (2013.01); *A01G 25/16* (2013.01); *B05B 9/0423* (2013.01); *B05B 9/06* (2013.01); *F16K 31/0655* (2013.01); *B05B 1/08* (2013.01); *B05B 9/0413* (2013.01)

(58) Field of Classification Search
CPC ....... B05B 9/0423; B05B 12/085; B05B 9/06; B05B 1/08; B05B 9/0413; F16K 31/0655
USPC ..... 239/11, 146, 67, 68, 159, 161, 162, 163, 239/170, 436, 443, 444, 548, 550, 551, 239/562, 556, 566, 557, 569, 578, 112, 239/113, 61, 62, 155–157, 172, 104, 106
See application file for complete search history.

(56) References Cited

U.S. PATENT DOCUMENTS

| | | | |
|---|---|---|---|
| 3,782,534 | A | 1/1974 | Holleman |
| 3,853,272 | A | 12/1974 | Deckser et al. |
| 4,328,025 | A | 5/1982 | Whitcomb |

(Continued)

OTHER PUBLICATIONS

Product Data Sheet for AIM Command® Spray System (Case IH), 2 pages, www.caseih.com/products, Aug. 30, 2004.

(Continued)

*Primary Examiner* — Arthur O Hall
*Assistant Examiner* — Steven M Cernoch
(74) *Attorney, Agent, or Firm* — Armstrong Teasdale LLP

(57) ABSTRACT

An electrically-actuated variable pressure control system for use with flow-controlled liquid application systems. Direct acting solenoid valves are pulsed at varying frequencies and duty cycles0000change the resistance to flow encountered by the flow-controlled liquid application system. This pulsing solenoid valve technique preserves a high degree of accuracy and uniformity through a wide range of pressure control. This wide range of pressure control indirectly allows the flow-controlled liquid application system to operate over a wider range of flow control, yielding indirect benefits to performance and productivity. When the solenoid valves are attached to pressure-atomization spray nozzles, control over spray pattern and droplet size is further achieved.

22 Claims, 8 Drawing Sheets

(51) Int. Cl.
*B05B 9/06* (2006.01)
*B05B 1/08* (2006.01)

(56) References Cited

U.S. PATENT DOCUMENTS

| | | |
|---|---|---|
| 4,530,463 A | 7/1985 | Hiniker et al. |
| 4,553,702 A | 11/1985 | Coffee et al. |
| 4,630,773 A | 12/1986 | Ortlip et al. |
| 4,637,547 A | 1/1987 | Huniker et al. |
| 4,823,268 A | 4/1989 | Giles et al. |
| 4,905,897 A | 3/1990 | Rogers et al. |
| 5,134,961 A | 8/1992 | Giles et al. |
| 5,334,987 A | 8/1994 | Teach |
| 5,348,226 A | 9/1994 | Heiniger et al. |
| 5,389,781 A | 2/1995 | Beck et al. |
| 5,433,380 A | 7/1995 | Hahn |
| 5,442,552 A | 8/1995 | Slaughter et al. |
| 5,520,333 A | 5/1996 | Tofte |
| 5,544,813 A | 8/1996 | Giles et al. |
| 5,624,409 A | 4/1997 | Seale |
| 5,653,389 A | 8/1997 | Henderson et al. |
| 5,704,546 A | 1/1998 | Henderson et al. |
| 5,763,873 A | 6/1998 | Beck et al. |
| 5,809,440 A | 9/1998 | Beck et al. |
| 5,833,144 A | 11/1998 | Kinter |
| 5,841,035 A | 11/1998 | Andoh et al. |
| 5,861,556 A | 1/1999 | Nukui et al. |
| 5,881,919 A | 3/1999 | Womac et al. |
| 5,908,161 A | 6/1999 | Womac et al. |
| 5,967,066 A | 10/1999 | Giles et al. |
| 6,003,383 A | 12/1999 | Zielinska et al. |
| 6,053,053 A | 4/2000 | Huotari |
| 6,126,088 A | 10/2000 | Wilger et al. |
| 6,170,338 B1 | 1/2001 | Kleven et al. |
| 6,260,941 B1 | 7/2001 | Su et al. |
| 6,270,020 B1 | 8/2001 | Thomason et al. |
| 6,565,015 B2 | 5/2003 | Leer et al. |
| 6,596,996 B1 | 7/2003 | Stone et al. |
| 6,689,338 B2 | 2/2004 | Kotov |
| 7,040,552 B2 | 5/2006 | McCrea et al. |
| 7,300,004 B2 | 11/2007 | Sinden et al. |
| 2005/0000277 A1 | 1/2005 | Giles |
| 2008/0001004 A1 | 1/2008 | Ringer |

OTHER PUBLICATIONS

Piezo Film Sensors Technical Manual, Measurement Specialties, Inc., Appendices A and B, pp. 59-82, Apr. 1999, Norristown, PA.
"Sensing Spray Nozzle Vibration as a Means for Monitoring Operation", by D.K. Giles, pp. 1-7, ILASS Americas, 17th Annual Conference on Liquid Atomization and Spray Systems, Arlington, VA.
U.S. Appl. No. 11/135,054, filed May 23, 2005 entitled "Networked Diagnostic and Control System for Dispensing Apparatus".(Issued U.S. Pat. No. 7,502,665).

ELECTRICALLY ACTUATED VARIABLE PRESSURE CONTROL SYSTEM

CROSS-REFERENCE TO RELATED APPLICATIONS

This application is a divisional of U.S. patent application Ser. No. 11/438,183, filed on May 22, 2006, which claims the benefit of U.S. Provisional Patent Application Ser. No. 60/688,259, filed on Jun. 7, 2005, both of which are hereby incorporated by reference herein in their entirety for all purposes.

BACKGROUND OF THE INVENTION

Spraying is a well-known method of applying a wide variety of bulk materials, primarily in liquid or a mixture of liquid and powder in a fluid propellant medium. Such spray materials can be dispensed in air currents, under liquid pressure, by gravity flow, or with any other suitable discharge means.

Spray application of bulk materials offers many potential advantages, including efficiency, uniformity of coverage and flexibility to adapt spraying equipment to various conditions unique to the objects being sprayed and their particular environments.

However, a disadvantage with many spray systems relates to the drift of spray particles and droplets away from their intended targets. Such drift is at best inefficient, as in the case of the overspray which represents wasted spray material, and in more serious situations can cause damage to nearby property, environment and people.

The field of agricultural spraying includes pesticide application for crop pest management and the application of fertilizer and growth regulators for nutrient management. The agricultural spraying industry is quite large, with pesticides alone currently accounting for approximately $3,000,000,000 in estimated annual expenditures. However, the use of pesticides in agricultural applications produces substantial benefits in crop yields with an estimated annual savings of approximately $12,000,000,000 in crops which would otherwise be lost to pests. The spray application of fertilizers and growth regulators likewise produces substantial benefits in crop yields and the like.

Notwithstanding the substantial advantages of agricultural spraying applications of pesticides and other spray materials, agricultural spraying is generally a relatively inefficient process. Factors which contribute to such inefficiencies include the susceptibility of sprayed materials to wind drift, overspray and inaccurate placement on the intended target crop plants. Irregularities in terrain and nonuniform plantings also contribute to the inconsistent and inefficient application of agricultural spray materials. Moreover, variations in ambient conditions such as wind, humidity levels and temperature tend to reduce the uniformity and efficiency with which spray materials are applied to their intended crop targets.

In addition to the inefficiencies associated with misdirected agricultural spray materials, overspray and spray drift can create significant problems if the materials are inadvertently applied to adjoining areas for which they were not intended. Such misapplication of agricultural spray materials can result in crop damage, injury to livestock, contamination of environmentally-sensitive areas and unnecessary human exposure to toxic materials.

The problems associated with the misapplication of agricultural spray materials are exacerbated by the use of larger spraying equipment covering wider swaths, high speed vehicles, air-blast spraying, and by aerial spraying. The inherent difficulties associated with large-scale spraying operations are balanced against the relative efficiencies which are achieved by covering larger areas more rapidly with wide-swath spraying equipment.

The Heiniger et al, U.S. Pat. No. 5,348,226 discloses a spray boom system with automatic boom end height control which uses an ultrasonic height control system for conforming the spray boom orientations to topography and slope of a zone being sprayed in order to increase uniformity of coverage. Uniform spray nozzle height can be a significant factor in achieving uniform spray material coverage.

Another important factor in spray material deposition control is the droplet size spectrum of the liquid being sprayed. Spray droplet size has been shown to significantly affect both the efficacy of pesticide treatments and the potential for off-target spray movement. Such off-target movement and deposition of spray is often called "spray drift". Insecticides, fungicides, growth regulators and post-emergence herbicides are generally more effective when applied using relatively small droplets, which tend to provide greater penetration of plant canopies and uniform coverage of foliar surfaces. Smaller spray droplets, with shorter mechanical relaxation times, have the advantage of more closely following air currents into dense plant canopies for achieving greater penetration and more uniform coverage. Conversely, such droplet mobility associated with smaller droplet sizes can exacerbate problems associated with spray drift away from application sites. Generally speaking, larger droplets tend to fall more directly due to their greater mass and are thus less susceptible to spray drift, evaporation, etc.

A common technique for controlling the application rate of spray liquid involves adjusting the spray liquid pressure, for example, with the use of a throttling valve in a main distribution line of a spray liquid distribution system. However, altering the liquid pressure also generally alters the droplet size, thus effecting the deposition and its susceptibility to spray drift, evaporation, etc.

The Giles et al. U.S. Pat. No. 5,134,961 discloses an electrically actuated variable flow control system wherein solenoid valves are actuated by square wave pulses, which can be varied in frequency and duty cycle for controlling volumetric flow through spray nozzles. The volumetric flow rate can thus be varied without changing droplet size and spray pattern since the liquid supply pressure can be maintained constant.

In addition to the aforementioned advantages of independently and selectively controlling the application rate and median droplet size setpoints, substantial advantages can be achieved by controlling spray deposition with respect to field position of a spray vehicle, such as a ground vehicle or an aircraft. Such position-responsive control can be important because spray zones in and around a field to be sprayed can require different treatment by a spray system, ranging from little or no application of spray materials (i.e., outside the boundary of a given site) to a maximum application rate in heavily infested areas or regions of poor fertility. The boundaries for such differential application rate spray zones can be irregular, with such irregularities increasing the difficulty of manually altering spray system operating conditions by an on-board operator. Moreover, problems can arise due to operator reaction times when changed field conditions call for adjustments to the spray conditions. For example, if an operator is alerted that he or she has crossed a field boundary or property line and initiates a procedure for altering spray application, most spray control systems have an inherent delay which may cause overspray problems.

To address some of these problems, control systems and methodology have heretofore been developed that respond to spray vehicle positions. For example, Ortlip U.S. Pat. No. 4,630,773 discloses a method and apparatus for spraying fertilizer wherein a computerized control system includes a field map with digital information concerning various soil types. The control system disclosed therein dispenses fertilizer in accordance with the optimum applications for the different soil conditions encountered in a target field. The spray liquid application rate is automatically adjusted for vehicle speed. Sensors are disclosed for determining malfunctions of the application hardware. However, the application control provided by the Ortlip apparatus occurs only along the direction of travel and not along the boom section. Moreover, the Ortlip apparatus does not provide for droplet size control, drift control or spray transport modeling for spray liquid deposition prediction.

Recent improvements in the accuracy and effectiveness of the global positioning system (OPS) for civilian applications have also created opportunities for greater automation of agricultural spraying by controlling agricultural spraying equipment with positioning systems responsive to specific field conditions. For example, Teach U.S. Pat. No. 5,334,987 discloses an agricultural aircraft control system using the global positioning system. The Teach agricultural aircraft control system is adapted for automatically opening a dispenser valve for releasing chemicals in response to the aircraft flying within the boundaries of an agricultural field. Moreover, the Teach system provides for recording flight data. However, the Teach system does not provide for droplet size control, drift reduction, spray transport modeling and gradients of application rates to avoid drift in the combination of the present invention.

Models for predicting dispersion and deposition of aerially released material have been in development for approximately the past 35 years in joint projects between the U.S.D.A. Forest Service, in cooperation with the U.S. Army. Computerized codes which are currently available include AGDISP (Agricultural DISPersal) (Bilanin et al., 1989) and FSCBG (Forest Service Cramer-Barry-Graham) (Teske et al., 1992b). Such computerized models can be useful for predicting dispersion patterns of various liquids under a variety of ambient conditions, heights, etc.

Giles et a teach a "Networked Diagnostic and Control System for Dispensing Apparatus", U.S. patent application Ser. No. 11/135,054, filed May 23, 2005, which is incorporated herein by reference thereto. Giles et al, discloses monitoring the flow rate of a fluid through a nozzle and monitoring the flow pattern that is emitted from the nozzle. A further need exists in the industry for a system that is also capable of maintaining a desired pressure in the system.

BRIEF SUMMARY OF THE INVENTION

In general, the present invention is directed to a system and method of controlling pressure and flow for application of an agrochemical from an agricultural spraying system. The invention is suitable for use with any of various types of spraying systems and in various and many application systems. For example, the system of the present invention can be used in conjunction with agricultural spray systems that are designed to apply liquids to a field.

The component parts of the system are simple and economical to manufacture, assemble and use. Other advantages of the invention will be apparent from the following description and the attached drawings, or can be learned through practice of the invention.

In one embodiment of the present invention, an agricultural spraying system includes a valve having a nozzle and an actuator assembly, the nozzle having an orifice defined therethrough, the actuator assembly being configured to control an emission of an agrochemical from the orifice; a pipe connected to the valve and configured to deliver the agrochemical thereto; a pressure sensor connected to the pipe for sensing a pressure in the pipe; and a pressure controller in communication with the pressure sensor, the pressure controller being configured to change a flow resistance based on the sensed pressure to maintain a predetermined pressure in the pipe for the emission of the agrochemical from the orifice.

In this aspect of the invention, the nozzle is a pressure-atomization spray nozzle is configured to produce a desired droplet size spectra and an agrochemical spray pattern.

Also in this aspect of the invention, the actuator assembly includes a reciprocating solenoid actuator configured to move relative to the orifice when a voltage is applied to the reciprocating solenoid actuator.

Further in this aspect of the invention, the actuator assembly includes a coil, a guide, and a plunger, the coil being disposed about the guide, the plunger being interposed between the guide and the orifice and being configured to move relative to the orifice when a voltage is applied to the coil.

In this aspect of the invention, the agricultural spraying system further includes means for controlling the actuator assembly, the actuator assembly defining an open position and a closed position. The means for controlling can be a square wave generator being configured to apply a voltage to the actuator assembly to move the actuator assembly from the closed position to the open position for the emission of the agrochemical from the orifice.

Also in this aspect of the invention, the square wave generator is configured to modulate a square wave frequency and a duty cycle to change the flow resistance for the emission of the agrochemical from the orifice. The square wave generator can be located in or in communication with the pressure controller.

Further in this aspect of the invention, the agricultural spraying system includes an agrochemical tank for holding the agrochemical, the agrochemical tank connected to the pipe.

In this aspect of the invention, the agricultural spraying system can also have a pump for pumping the agrochemical through the pipe. The pump can be a positive displacement pump or a centrifugal pump.

Also in this aspect of the invention, the agricultural spraying system can have a wheel and a piston, the piston connected to the wheel and to the positive displacement pump, the piston being configured to reciprocate the positive displacement pump as the wheel turns.

Further in this aspect of the invention, the agricultural spraying system includes a plurality of valves, each of the valves being configured for independent operation, or at least two of the valves being configured as a group to stop the emission of the agrochemical from the group.

In another embodiment of the present invention, an agricultural spraying system includes an actuating valve including a nozzle and an actuator assembly, the nozzle having an orifice defined therethrough, the actuator assembly being configured to control an emission of an agrochemical from the orifice; a pipe connected to the actuating valve and configured to deliver the agrochemical thereto; a regulating valve connected to the pipe for regulating a predetermined flow rate of the agrochemical through the pipe; a flow controller in communication with the regulating valve to control the predetermined flow rate; a pressure sensor connected to the pipe for sensing a pressure in the pipe and a pressure controller in communication with the pressure sensor, the pressure controller being configured to change a flow resistance based on the sensed pressure to maintain a predetermined pressure in the pipe for the emission of the agrochemical from the orifice, the predetermined pressure dictated by the flow resistance.

In this aspect of the invention, the agricultural spraying system further includes a square wave generator being configured to apply a voltage to the actuator assembly to move the actuator assembly from a closed position to an open position for the emission of the agrochemical from the orifice. More particularly, the square wave generator can modulate a square wave frequency and a duty cycle to change the flow resistance for the emission of the agrochemical from the orifice.

Also in this aspect of the invention, the pressure controller determines the predetermined flow resistance based on a system speed, a system condition, an application rate, a target area size, a geographic location, a field position, a weather phenomenon and combinations thereof.

Further in this aspect of the invention, the pressure controller determines the predetermined pressure and maintains the predetermined pressure based on a system speed, a system condition, an application rate, a target area size, a geographic location, a field position, a weather phenomenon and combinations thereof.

In this aspect of the invention, the agricultural spraying system also includes a controller configured to set the predetermined resistance to flow.

In yet another embodiment of the present invention, a method of controlling pressure and flow for application of an agrochemical from an agricultural spraying system is provided. The method includes pumping an agrochemical from a tank through a pipe to an actuating valve including a nozzle and an actuator assembly, the nozzle having an orifice defined therethrough, the actuator assembly being configured to control an emission of the agrochemical from the orifice; regulating a predetermined flow rate of the agrochemical through the pipe by a regulating valve connected to the pipe; controlling the predetermined flow rate with a flow controller in communication with the regulating valve; sensing a pressure in the pipe using a pressure sensor connected to the pipe; and changing a flow resistance with a pressure controller based on the sensed pressure to maintain a predetermined pressure in the pipe, the pressure controller in communication with the pressure sensor, the pressure controller being configured to for the emission of the agrochemical from the orifice, the predetermined pressure dictated by the flow resistance.

In this aspect of the invention, the method further includes changing the flow rate to change the pressure.

Also in this aspect of the invention, the method further includes assessing correctness of the flow rate with the flow controller.

Further in this aspect of the invention, the method includes opening the regulating valve when the flow rate is too low.

Also in this aspect of the invention, the method further includes closing the regulating valve when the flow rate is too high.

In this aspect of the invention, the method further includes assessing correctness of the sensed pressure with the pressure sensor.

Also in this aspect of the invention, the method further includes increasing flow resistance when the sensed pressure is too low.

In this aspect of the invention, decreasing a duty cycle of a square wave increases flow resistance.

Further in this aspect of the invention, the method includes decreasing flow resistance when the sensed pressure is too high.

In this aspect of the invention, increasing a duty cycle of a square wave decreases flow resistance.

BRIEF DESCRIPTION OF THE DRAWINGS

Further aspects and advantages of the invention will be apparent from the following description, or can be learned through practice of the invention, in combination with the drawings, which serve to explain the principles of the invention but by no means are intended to be exhaustive of all of possible manifestations of the invention. Thus, at least one embodiment of the invention is shown in the drawings in which.

DETAILED DESCRIPTION OF THE INVENTION

Figure 1:
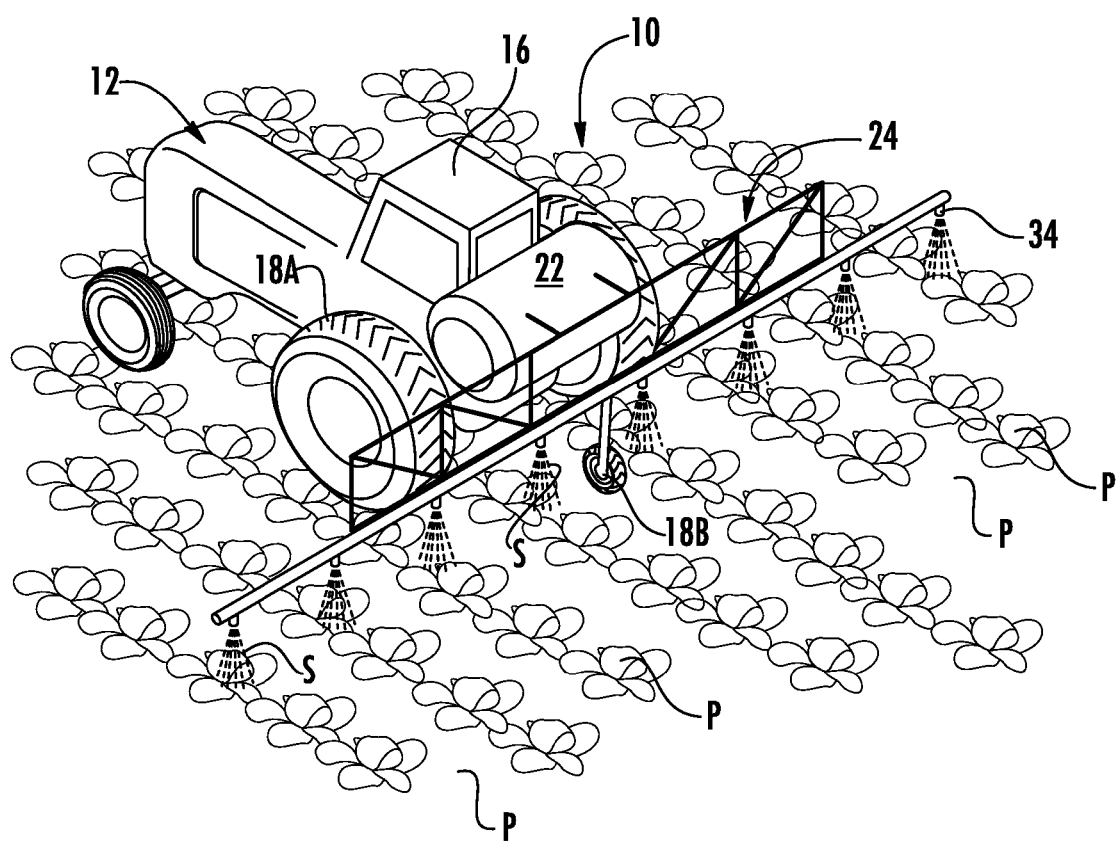
FIG. 1 is a perspective view of a dispensing system according to an aspect of the present invention installed in an environment for which it is intended to be used.

Detailed reference will now be made to the drawings in which examples embodying the present invention are shown. The detailed description uses numerical and letter designations to refer to features of the drawings. Like or similar designations of the drawings and description have been used to refer like or similar parts of the invention.

The drawings and detailed description provide a full and written description of the invention, and of the manner and process of making and using it, so as to enable one skilled in the pertinent art to make and use it, as well as the best mode of carrying out the invention. However, the examples set forth in the drawings and detailed description are provided by way of explanation only and are not meant as limitations of the invention. The present invention thus includes any modifications and variations of the following examples as come within the scope of the appended claims and their equivalents.

Figure 2:
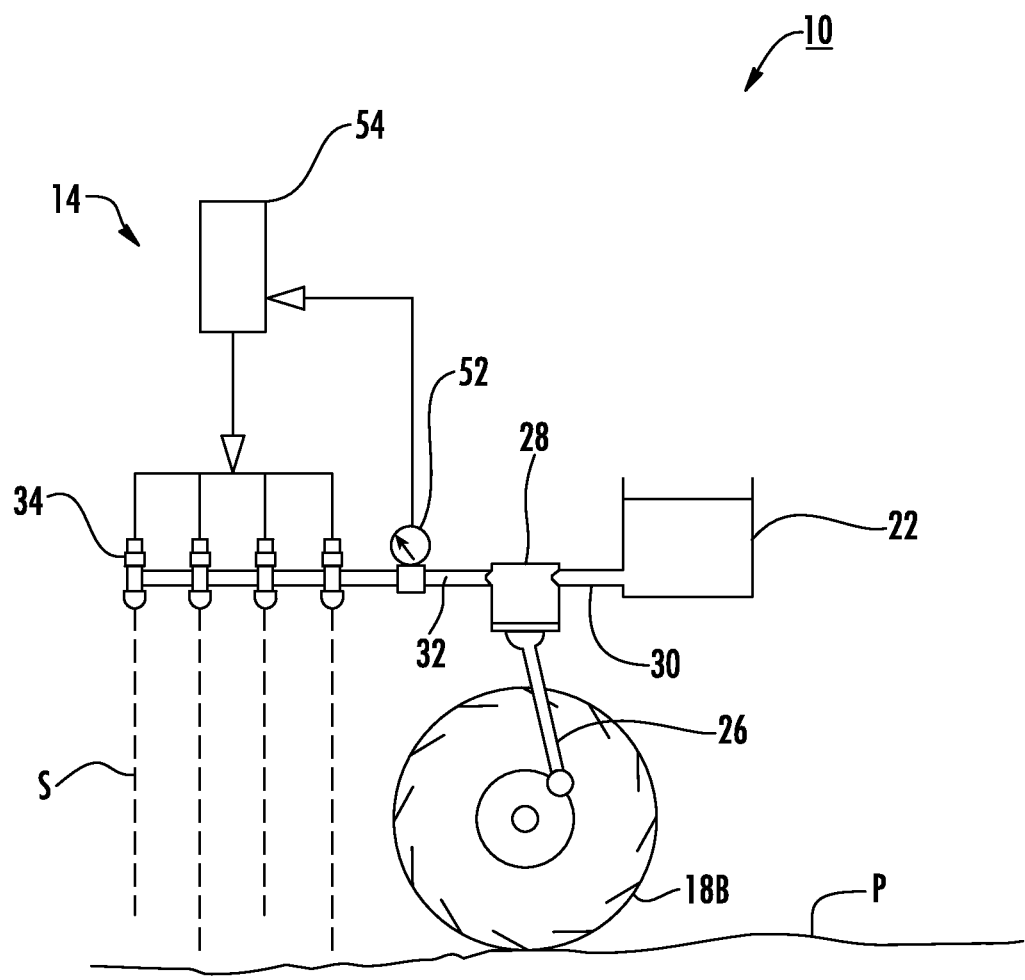
FIG. 2 is a schematic of a flow control system that can be employed in the system of FIG. 1, particularly showing a ground-speed-compensating, positive-displacement pump and an electrically-actuated variable pressure control system according to one aspect of the invention.

As broadly embodied in FIGS. 1 and 2, an exemplary agricultural system, designated in general by the numeral 10, broadly includes a tractor 12 having an electrically-actuated variable pressure control system 14. As shown, the tractor 12 includes a cab 16, a plurality of wheels 18A at least one boom wheel 18B for engaging a section of ground with a crop, produce, product or the like (generally, P), a tank or reservoir 22, and a spray boom 24 with a plurality of nozzles 34 attached to the spray boom 24. The tank 22 holds a liquid, a mixture of liquid and powder, or other product designated in general by the letter S. The liquid can be a quantity of water or an agrochemical such as a fertilizer or a pesticide. Likewise, the liquid-powder mixture can be the agrochemical. Thus, the product S can be sprayed from the nozzles 34 onto a crop or product or the ground P itself as shown in FIG. 1 and described in greater detail by example operation below.

FIG. 2 more particularly shows the boom wheel 18B attached to a slider-crank or piston mechanism 26, which is connected to a ground speed compensating positive displacement pump 28. As shown, the boom wheel 18B rolls across the ground P and turns a slider-crank mechanism 26, which reciprocates the positive displacement pump 28. The positive displacement pump 28 is calibrated to apply a specific amount per acre of product S to soil of the ground P.

As briefly introduced, the product S is contained in the tank 22 and enters the positive displacement pump 28 through a suction pipe 30. The product S flows from the positive displacement pump 28, through a boom pipe 32, to the direct acting solenoid valve equipped nozzles 34. As shown in FIGS. 1 and 2, the product S flows from the nozzles 34 and is applied to the ground P in various ways; e.g., pulsed, patterned and the like as taught by Giles et al, in U.S. Pat. No. 5,134,961 and incorporated herein by reference thereto. The skilled artisan will appreciate that pipe as used herein can mean any type of conduit or tube made of any suitable material such as metal or plastic. The skilled artisan will further appreciate that other ground application devices can be added to provide varying effects of placement of the product S on top or below a soil surface of the ground P, such as via pipes, knives, coulters, and the like.

FIG. 2 further shows a pressure sensor 52, which measures the pressure in the boom pipe 32. The pressure sensor 52 sends this pressure information to a pressure controller 54. In this example, the pressure controller 54 pulses the direct acting solenoid valve equipped nozzles 34 with a frequency and duty cycle that maintains a specific pressure within the boom pipe 32. An example of this operation is described below.

Figures 3A, 3B:
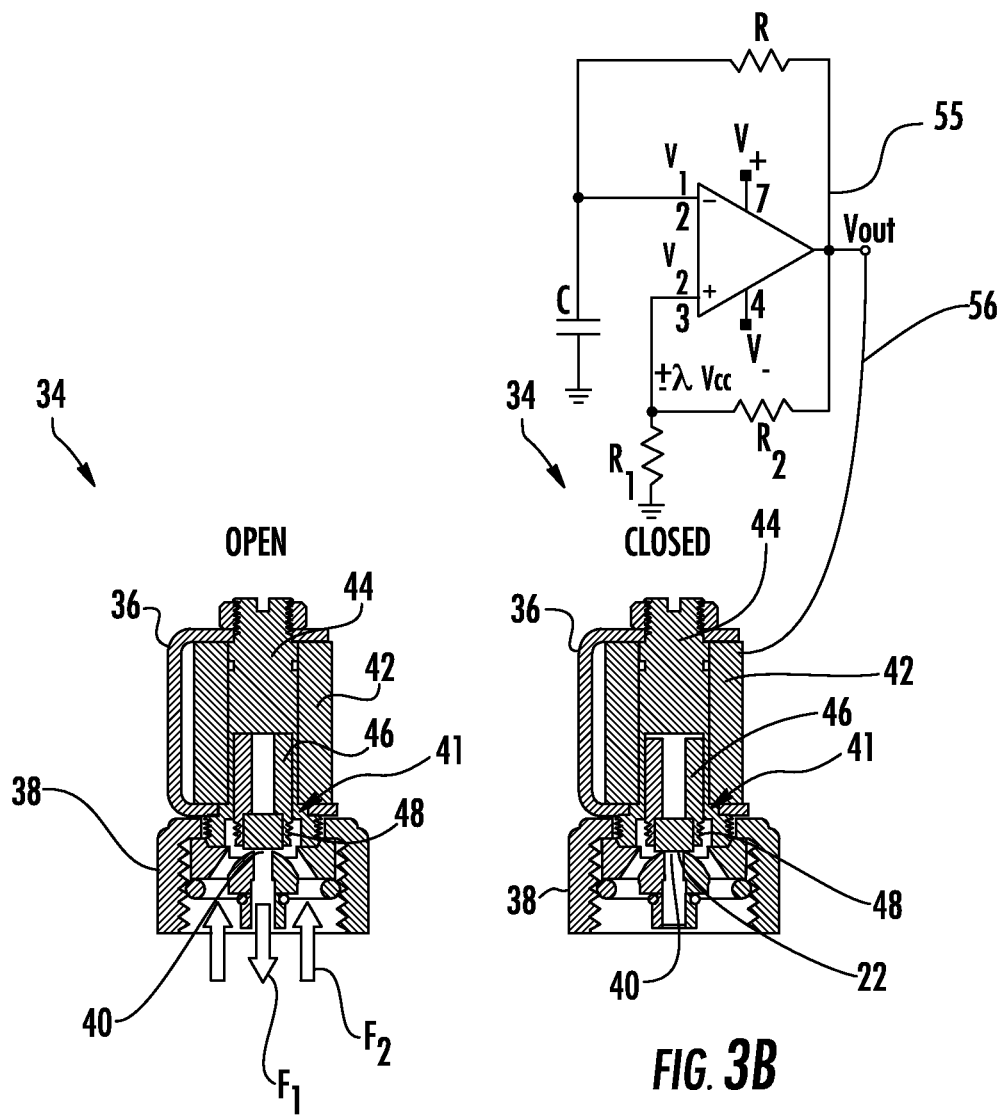
FIG. 3A shows a sectional view of a solenoid valve in an open position.
FIG. 3B shows a sectional view of the solenoid valve as in FIG. 3A in a closed position.

Turning now to FIGS. 3A and 3B, the direct acting solenoid valve equipped nozzle 34 is shown respectively in open and closed positions. The direct acting solenoid nozzle 34 pulses with a frequency and duty cycle such that an orifice 40 is active only when the valve-equipped nozzle 34 is open. The frequency is sufficiently fast to diminish any effects of pulsing on the total system, therefore creating a controlled variable resistance to flow.

More specifically, as shown in FIGS. 3A and 3B, the nozzle 34 has a body 36 including mounting means such as a bracket or screw-fitting 38 for mounting the nozzle 34 to the boom pipe 32. As shown, the orifice 40 is configured for outlet flow F1 and inlet flow F2. This aspect of the invention is described in greater detail below.

As particularly shown in FIG. 3B, the nozzle 34 also includes an actuator assembly 41, which has an actuator or coil 42 located on or around a guide 44. As shown, a plunger 46 is movably positioned between the guide 44 and the orifice 40. A square wave generator 55 is connected to the nozzle 34 and applies an electric signal or voltage 56 to the coil 42, which establishes a magnetic field. The magnetic field causes the guide 44 to become magnetized, which attracts the plunger 46. In this example, the magnetic force of the guide 44 overcomes a spring force of a spring 48 and a force of the inlet flow F2 as applied to the orifice 40. When the plunger 46 lifts a seal 50 from the orifice 40, the outlet flow F1 results.

Figure 4:
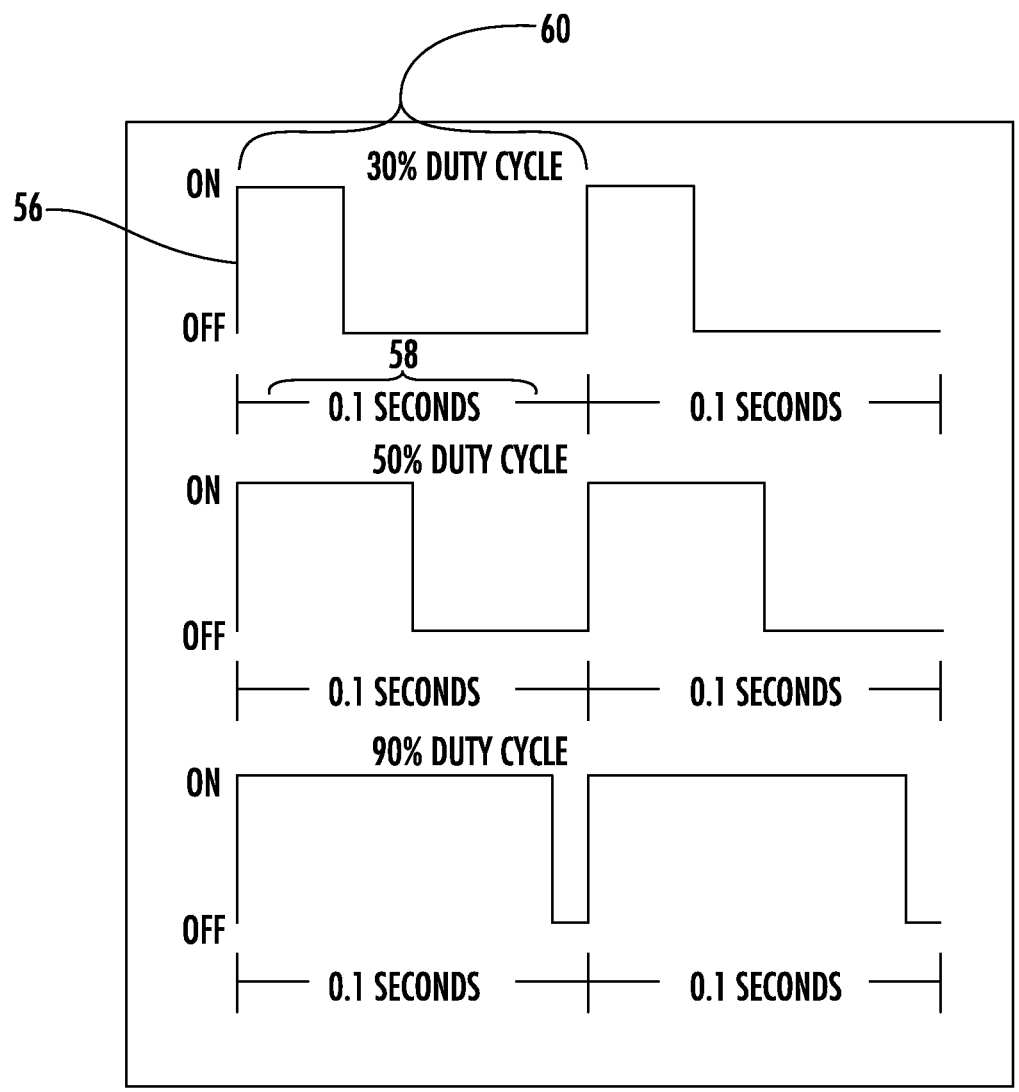
FIG. 4 shows a puke width modulation technique for various duty cycles employed in the electrically-actuated pressure control system as in FIG. 1.

FIG. 4 shows a pulse width modulation (PWM) signal used to actuate the direct acting solenoid nozzle 34 as in FIGS. 1 and 2. In this example, the electric signal 56 is pulsed with a fixed period length 58 of 0.1 seconds. When the signal 56 is high; i.e., when voltage is present, the pulse is shown at the ON position. As shown, the signal 56 remains high or ON for a portion of the period length 58 before switching low; i.e., no voltage is present. The relation of on-time to period length 58 is called a duty cycle 60 and is measured in percent (%). Three duty cycles of 30%, 50% and 90% are shown in FIG. 4. As described with respect to FIG. 3 above, the directing acting solenoid nozzle 34 will open and close with this on/off pulse. For example, if the duty cycle 60 is 50%, the resulting resistance to flow will be 50% of the total resistance to flow of the orifice 40. Similar respective results occur with the 30% and 90% duty cycles 60.

Figure 5:
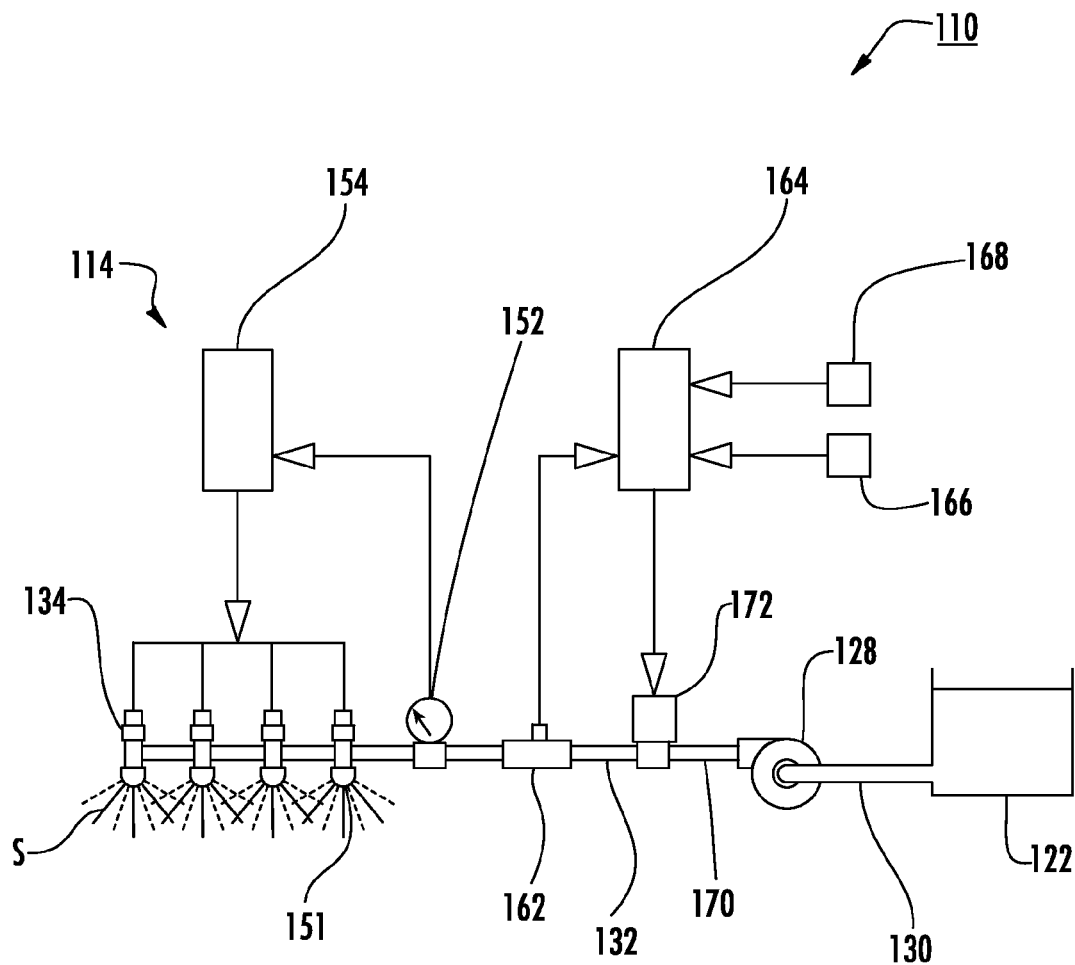
FIG. 5 is a schematic of another flow control system that can be employed in the system of FIG. 1, particularly showing a flow meter, a flow regulating valve and an electrically-actuated variable pressure control system.

Turning now to FIG. 5, an agricultural spraying system 110 includes an electrically-actuated flow control system 114 including a flow meter 162 and a flow regulating valve 172. Many of the components of the agricultural spraying system 110 are similar to the components of the foregoing embodiments as described above and reference is made thereto for an enabling description of these components if not expressly described below.

As in the previously described embodiment, a product S in FIG. 5 flows from a tank 122 to a centrifugal pump 128 via a suction pipe 130. As shown, the product S flows from the centrifugal pump 128 to the flow regulating valve 172 via a pressure pipe 170. The flow regulated product S flows to the flow meter 162, to a pressure sensor 152, and to the direct acting solenoid valve equipped nozzles 134 via a boom pipe 132. Thus, the product S is delivered to a target such as the crop or ground P in FIG. 1 via spray atomization nozzles 151 of the direct acting solenoid valves 134.

More particularly, the flow meter 162 in FIG. 5 measures the flow rate and sends a signal to a flow controller 164. The flow controller 164 receives target rate information from a rate input device 168 and speed from a speed input device 166. Accordingly, the flow controller 164 controls the flow regulating valve 172 to the desired rate. Additionally, the pressure sensor 152 measures the pressure in the boom pipe 132 and sends the pressure information to a pressure controller 154. The pressure controller 154 pulses the direct acting solenoid valve equipped nozzles 134 with a frequency and duty cycle which maintains a specific pressure within the pipe 132.

The skilled artisan will appreciate that a conventional flow-control system operates by shifting a flow control system curve along a fixed pressure control curve. The intersection of the two curves is the resultant conventional application flow and pressure. As the flow changes in such a conventional system, the intersection changes accordingly such that a new system pressure is achieved as a direct result of the flow change.

Figure 6:
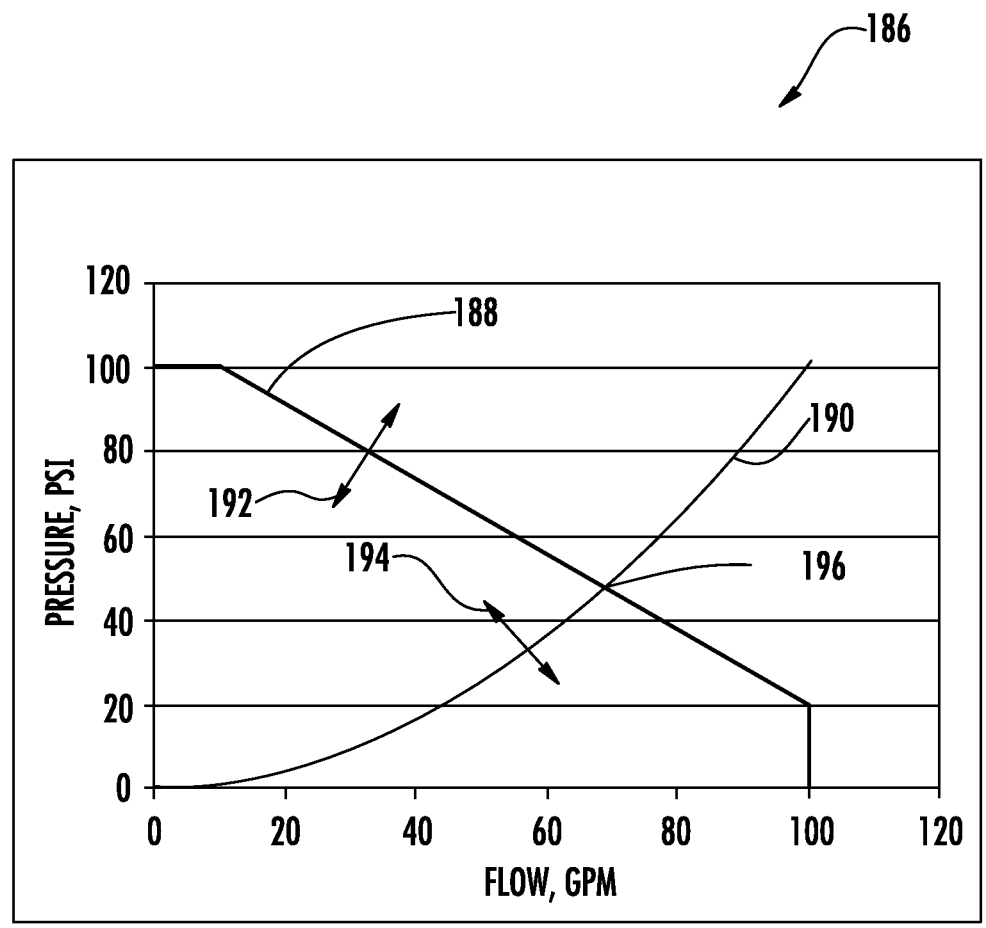
FIG. 6 is a graph showing an interdependent relationship between flow control and pressure control when an electrically-actuated variable pressure control system is used in conjunction with a flow control system according to an aspect of the invention.

FIG. 6 generally shows an interdependent relationship between flow control and pressure control when an electrically-actuated variable pressure control system is used in conjunction with a flow control system. More specifically, FIG. 6 shows a relative, pressure-versus-flow relationship for liquid flow-control systems, and an electrically-actuated variable pressure control system as described above.

As shown in FIG. 6, an electrically-actuated pressure control system according to the present invention allows a pressure control curve 190 to be shifted in various directions indicated by a double-headed arrow 194, which is an independent shift from a change in a flow indicated by a double-headed arrow 192. The result is that an intersection 196 may be navigated to any flow and pressure setting desired by an operator, within limits of the system. This ability, when controlled by flow and pressure controllers, allows the operator to set flow and pressure set points independently, and have both set points maintained throughout a range of speed. In addition, the flow set point may be changed without effecting the pressure set point, and vise versa.

Figure 7:
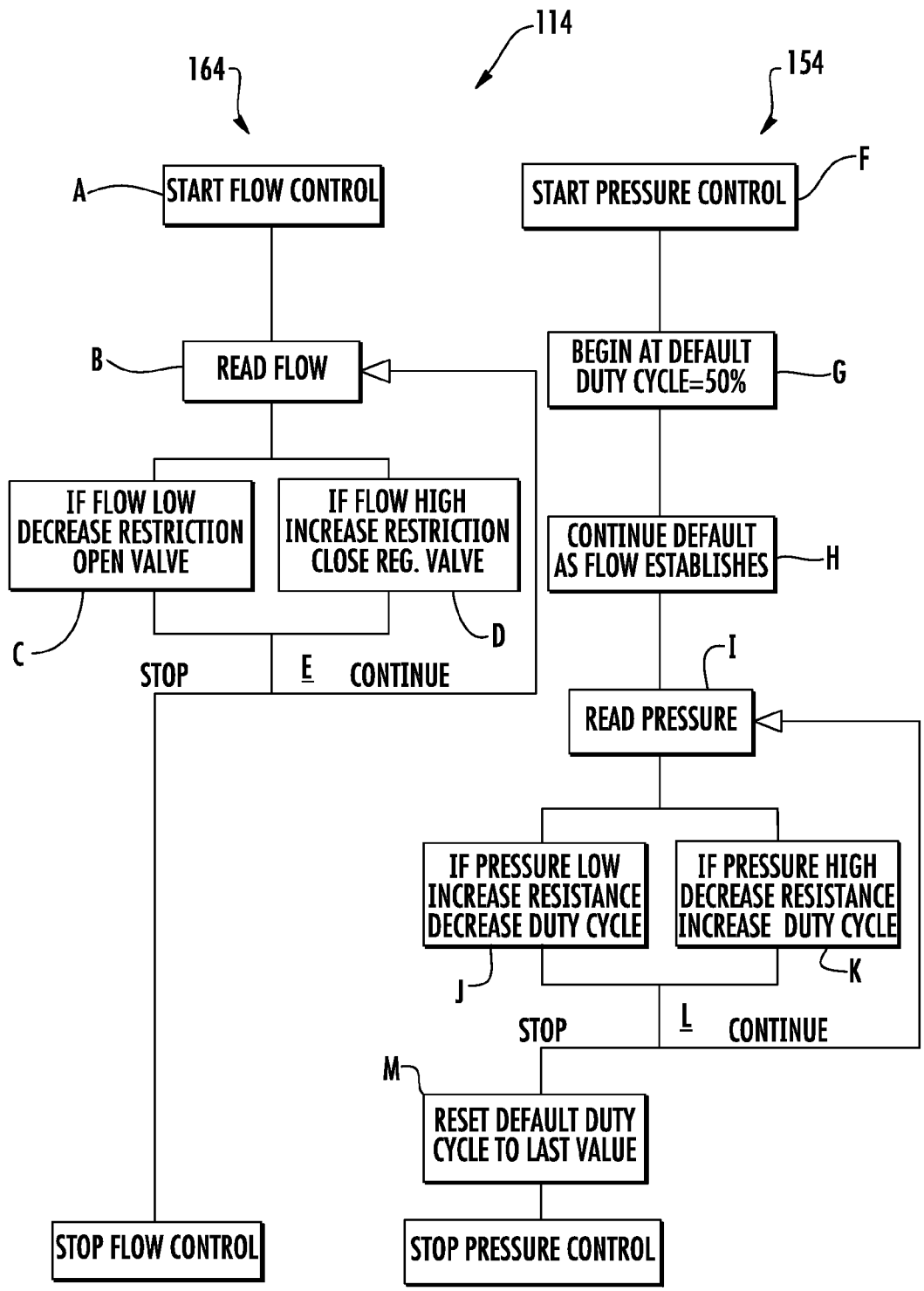
FIG. 7 shows a flow chart of control logic employed by the flow control system and the pressure control system as in FIG. 6.

With reference now to FIGS. 5, 6 and 7, a control logic is employed by the flow controller 164 and the electrically-actuated variable pressure control system 154 according to an aspect of the invention. In particular, FIG. 7 shows start-up of the flow control system 164 at step A. A flow is read at step B, and a calculation occurs to determine if the flow is too high or too low. This calculation may be simple or complex depending on the variables upon which flow is being controlled. As shown at step C, if the flow is too low, a restriction is relieved by opening the flow regulating valve 172 as in FIG. 5. Conversely, if the flow is too high at step D, a restriction can be increased by closing the flow regulating valve 172. The routine of reading and changing flow is operated continuously while the flow-control system 164 is active. Those skilled in the art will appreciate that alternate mechanisms and methods of changing flow may be employed; for instance, by using the ground driven positive pump 28 of FIG. 1, or by changing the speed of the pump 28.

Also shown in FIG. 7, the control logic of the electrically-actuated variable pressure control system 154 is similar to that of the flow control system 164 described above. Upon start-up of the pressure control system 154 at step F, a duty cycle is initiated at step G at a desired value, which is 50% in this example. This value can be set at a control panel 174 as described below with respect to FIG. 8. The initiated value is held for a predetermined or initiation time (step H) while the flow control system 164 adjusts to the target flow. When the initiation time is over, the pressure is read at step I. If the pressure is too low, the resistance to flow is increased at step J by decreasing the duty cycle 60 of the direct acting solenoid nozzle 134. Conversely, if the pressure is too high, the resistance to flow is decreased at step K by increasing the duty cycle 60 of the direct acting solenoid nozzle 134. When the pressure control system 154 is stopped, the initializing duty cycle is reset to the last known duty cycle. This delay allows the flow control system 164 to initialize and grants some priority to flow over pressure.

Figure 8:
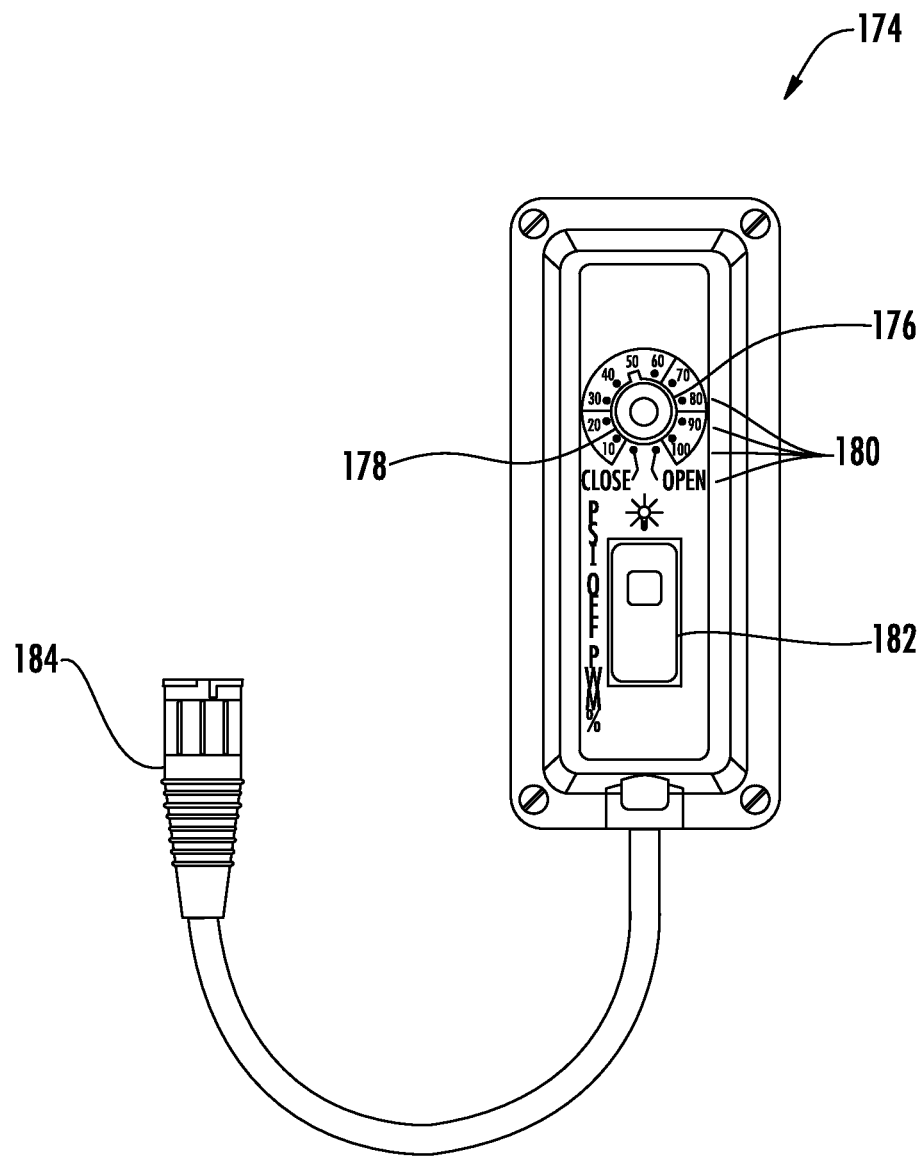
FIG. 8 is an elevational view of a control panel used to control the foregoing embodiments according to a further aspect of the invention.

FIG. 8 shows an embodiment of the control panel 174, briefly introduced above, for the electrically-actuated pressure control system 154. The control panel 174 is mounted in a vehicle such as in the cab 16 of the tractor 12 at FIG. 1 within reach of the operator. In this example, a knob 176 is shown having twelve detents 180. These twelve detents 180 indicate a target pressure set point, or duty cycle, that the controller 154/164 is to maintain.

As shown in FIG. 8, a mode of operation is dictated by a switch 182. In this example, the three position switch 182 is off in a center position, in a "PSI" mode in an uppermost position, and in a "PWM %" mode in a downward position. Thus, the position of the switch 182 in FIG. 8 indicates whether the knob 176 detent is calibrated for PSI or PWM %. Making two modes of operation available reduces downtime in the event of a system failure. For instance, in PWM % mode, the system can be run from manually calculated settings until the automatic pressure control system can be repaired.

As further shown in FIG. 8, a color graphic 178 can be utilized to guide the operator to more advantageous settings of the knob 176. For instance, desirable ranges can be color coded green, less desirable ranges can be yellow and ranges that should be used sparingly or avoided can be colored orange or red.

Also shown in FIG. 8, a connector 184 is attached to a wiring harness, which connects the panel 174 to other components of the system 110. One skilled in the art will appreciate how the connector 184 connects the panel 174 and further description is not necessary to understand and practice this aspect of the invention.

These and other modifications and variations to the present invention may be practiced by those of ordinary skill in the art, without departing from the spirit and scope of the present invention. In addition, it should be understood that aspects of the various embodiments may be interchanged either in whole or in part. Furthermore, those of ordinary skill in the art will appreciate that the foregoing description is by way of example only, and is not intended to limit the invention.

That which is claimed is:

1. A method of controlling pressure and flow for application of an agrochemical from an agricultural spraying system, the method comprising:

pumping an agrochemical from a tank through a pipe to an actuating valve including a nozzle and an actuator assembly, the nozzle having an orifice defined therethrough, the actuator assembly being configured to control an emission of the agrochemical from the orifice;

regulating a predetermined flow rate of the agrochemical through the pipe by a regulating valve connected to the pipe;

controlling the predetermined flow rate with a flow controller in communication with the regulating valve;

sensing a pressure in the pipe using a pressure sensor connected to the pipe; and changing a flow resistance with a pressure controller based on the sensed pressure to maintain a predetermined pressure in the pipe, the pressure controller in communication with the pressure sensor, the pressure controller being configured for the emission of the agrochemical from the orifice, the predetermined pressure dictated by the flow resistance, wherein changing the flow resistance comprises changing the flow resistance to one of a plurality of resistance values, the plurality of resistance values including a maximum resistance, a minimum resistance, and at least one value between the maximum resistance and the minimum resistance.

2. The method as in claim 1, further comprising changing the flow rate to change the pressure.

3. The method as in claim 1, further comprising assessing correctness of the flow rate with the flow controller.

4. The method as in claim 1, further comprising opening the regulating valve when the flow rate is too low.

5. The method as in claim 1, further comprising closing the regulating valve when the flow rate is too high.

6. The method as in claim 1, further comprising assessing correctness of the sensed pressure with the pressure sensor.

7. The method as in claim 1, further comprising increasing flow resistance when the sensed pressure is too low.

8. The method as in claim 7, wherein increasing flow resistance includes decreasing a duty cycle of a square wave.

9. The method as in claim 1, further comprising decreasing flow resistance when the sensed pressure is too high.

10. The method as in claim 9, wherein decreasing flow resistance includes increasing a duty cycle of a square wave.

11. The method of claim 1, wherein the actuator assembly includes a solenoid valve, and wherein changing the flow resistance comprises changing a duty cycle of the solenoid valve.

12. The method of claim 1, wherein the flow resistance is changed to the at least one value between the maximum resistance and the minimum resistance, the at least one value being in a range from about 30% to about 90% of the maximum resistance.

13. The method of claim 1, wherein changing a flow resistance comprises continuously pulsing the actuator assembly according to a duty cycle.

14. The method of claim 13, wherein changing a flow resistance further comprises transmitting control signals from the pressure controller to the actuator assembly, the control signals being associated with the duty cycle.

15. The method of claim 14, wherein the control signals are generated by a square wave generator associated with the pressure controller.

16. The method of claim 13, wherein changing a flow resistance further comprises increasing the duty cycle at which the actuator assembly is pulsed in order to decrease the flow resistance when the sensed pressure exceeds the predetermined pressure.

17. The method of claim 13, wherein changing a flow resistance further comprises decreasing the duty cycle at which the actuator assembly is pulsed in order to increase the flow resistance when the sensed pressure is less than the predetermined pressure.

18. The method of claim 13, wherein the actuator assembly is continuously pulsed in order to maintain the predetermined pressure independent of a predetermined flow rate of the agrochemical through the pipe.

19. The method of claim 13, wherein the actuator assembly is movable from a closed position to an open position, the actuator assembly being configured to seal the orifice when the actuator assembly is moved to the closed position.

20. The method of claim 1 further comprising:

receiving, at the flow controller, target rate information; and receiving, at the pressure controller, a target pressure set point;

wherein regulating a predetermined flow rate includes regulating the predetermined flow rate based on the target rate information, and wherein changing a flow resistance includes changing the flow resistance to maintain a predetermined pressure in the pipe based on the target pressure set point.

21. A method of controlling pressure and flow for application of an agrochemical from an agricultural spraying system, the method comprising:

pumping an agrochemical from a tank through a pipe to an actuating valve including a nozzle and an actuator assembly, the nozzle having an orifice defined therethrough, the actuator assembly being configured to control an emission of the agrochemical from the orifice;

regulating a predetermined flow rate of the agrochemical through the pipe by a regulating valve connected to the pipe;

controlling the predetermined flow rate with a flow controller in communication with the regulating valve;

sensing a pressure in the pipe using a pressure sensor connected to the pipe; and changing a flow resistance with a pressure controller based on the sensed pressure to maintain a predetermined pressure in the pipe by continuously pulsing the actuator assembly according to a duty cycle, wherein changing the flow resistance comprises:

increasing the duty cycle at which the actuator assembly is pulsed in order to decrease the flow resistance when the sensed pressure exceeds the predetermined pressure; and decreasing the duty cycle at which the actuator assembly is pulsed in order to increase the flow resistance when the sensed pressure is less than the predetermined pressure, wherein the pressure controller is in communication with the pressure sensor, the pressure controller being configured for the emission of the agrochemical from the orifice, the predetermined pressure dictated by the flow resistance.

22. A method of controlling pressure and flow for application of an agrochemical from an agricultural spraying system, the method comprising:

pumping an agrochemical from a tank through a pipe to an actuating valve including a nozzle and an actuator assembly, the nozzle having an orifice defined therethrough, the actuator assembly being configured to control an emission of the agrochemical from the orifice;

regulating a predetermined flow rate of the agrochemical through the pipe by a regulating valve connected to the pipe;

controlling the predetermined flow rate with a flow controller in communication with the regulating valve;

sensing a pressure in the pipe using a pressure sensor connected to the pipe; and changing a flow resistance with a pressure controller based on the sensed pressure to maintain a predetermined pressure in the pipe by continuously pulsing the actuator assembly according to a duty cycle, the pressure controller is in communication with the pressure sensor, the pressure controller being configured for the emission of the agrochemical from the orifice, the predetermined pressure dictated by the flow resistance, wherein the actuator assembly is continuously pulsed in order to maintain the predetermined pressure independent of a predetermined flow rate of the agrochemical through the pipe.

* * * * *